US012579633B2

(12) United States Patent
Basistyy et al.

(10) Patent No.: US 12,579,633 B2
(45) Date of Patent: Mar. 17, 2026

(54) PERIODIC-PATTERN BACKGROUND REMOVAL

(71) Applicant: Onto Innovation Inc., Wilmington, MA (US)

(72) Inventors: Roman S. Basistyy, Sunny Isles Beach, FL (US); Jin Ju, Edina, MN (US); Jian Ding, Methuen, MA (US); Jatinder Dhaliwal, Plano, TX (US)

(73) Assignee: Onto Innovation Inc., Wilmington, MA (US)

( * ) Notice: Subject to any disclaimer, the term of this patent is extended or adjusted under 35 U.S.C. 154(b) by 289 days.

(21) Appl. No.: 18/220,636

(22) Filed: Jul. 11, 2023

(65) Prior Publication Data

US 2024/0020819 A1 Jan. 18, 2024

Related U.S. Application Data

(60) Provisional application No. 63/388,562, filed on Jul. 12, 2022.

(51) Int. Cl.
 *G06T 7/00* (2017.01)
 *G06T 5/10* (2006.01)
(52) U.S. Cl.
 CPC .............. *G06T 7/0008* (2013.01); *G06T 5/10* (2013.01); *G06T 2207/20132* (2013.01)
(58) Field of Classification Search
 CPC .................... G06T 7/0008; G06T 5/10; G06T 2207/20132
 See application file for complete search history.

(56) References Cited

U.S. PATENT DOCUMENTS 3,586,434 A * 6/1971 Mueller ................. G03B 33/00
                                                                  355/71
3,743,423 A * 7/1973 Heinz .............. G01N 21/95623
                                                                  359/559

(Continued)

FOREIGN PATENT DOCUMENTS

CN        110084768        8/2019
JP        H06242013        9/1994

(Continued)

OTHER PUBLICATIONS

"International Application Serial No. PCT US2023 027376, International Preliminary Report on Patentability mailed Jan. 23, 2025", 8 pages.

(Continued)

*Primary Examiner* — Manav Seth
(74) *Attorney, Agent, or Firm* — Schwegman Lundberg & Woessner, P.A.

(57) ABSTRACT

Various examples described herein include various mechanisms, techniques, and methods to subtract collected signals caused by a periodic pattern formed on substrates to enable a higher level of defect detection on substrates. Signals detected by various types of metrology and substrate-inspection systems that are caused by periodic patterns on inspected substrates can be reduced or eliminated by, for example, a Fourier analysis of the detected signals. Both gray-scale value thresholds and area thresholds may be applied after the Fourier analysis of the image and are sufficient for defect detection on an image with a substantially-reduced number of false defects or no defects being present in a final image produced after processing. Other techniques and methods are also disclosed.

18 Claims, 6 Drawing Sheets

(56)                  References Cited

U.S. PATENT DOCUMENTS

| | | | | |
|---|---|---|---|---|
| 3,790,280 | A * | 2/1974 | Heinz .................... | G02B 27/46 |
| | | | | 359/558 |
| 5,537,669 | A * | 7/1996 | Evans ................... | G06T 7/0004 |
| | | | | 382/280 |
| 7,826,682 | B2 * | 11/2010 | Behiels ..................... | G06T 5/70 |
| | | | | 382/280 |
| 2004/0202361 | A1 | 10/2004 | Evans et al. | |

FOREIGN PATENT DOCUMENTS

| | | |
|---|---|---|
| JP | H0921757 | 1/1997 |
| JP | H11339040 | 12/1999 |
| TW | 201918795 | 5/2019 |
| TW | 202419853 | 5/2024 |
| WO | 2024015364 | 1/2024 |

OTHER PUBLICATIONS

"Taiwanese Application Serial No. 112125873, Office Action mailed Apr. 2, 2024", with Concise Statement of Relevance.
"International Application Serial No. PCT US2023 027376, International Search Report mailed Nov. 1, 2023", 3 pages.
"International Application Serial No. PCT US2023 027376, Written Opinion mailed Nov. 1, 2023", 6 pages.

\* cited by examiner

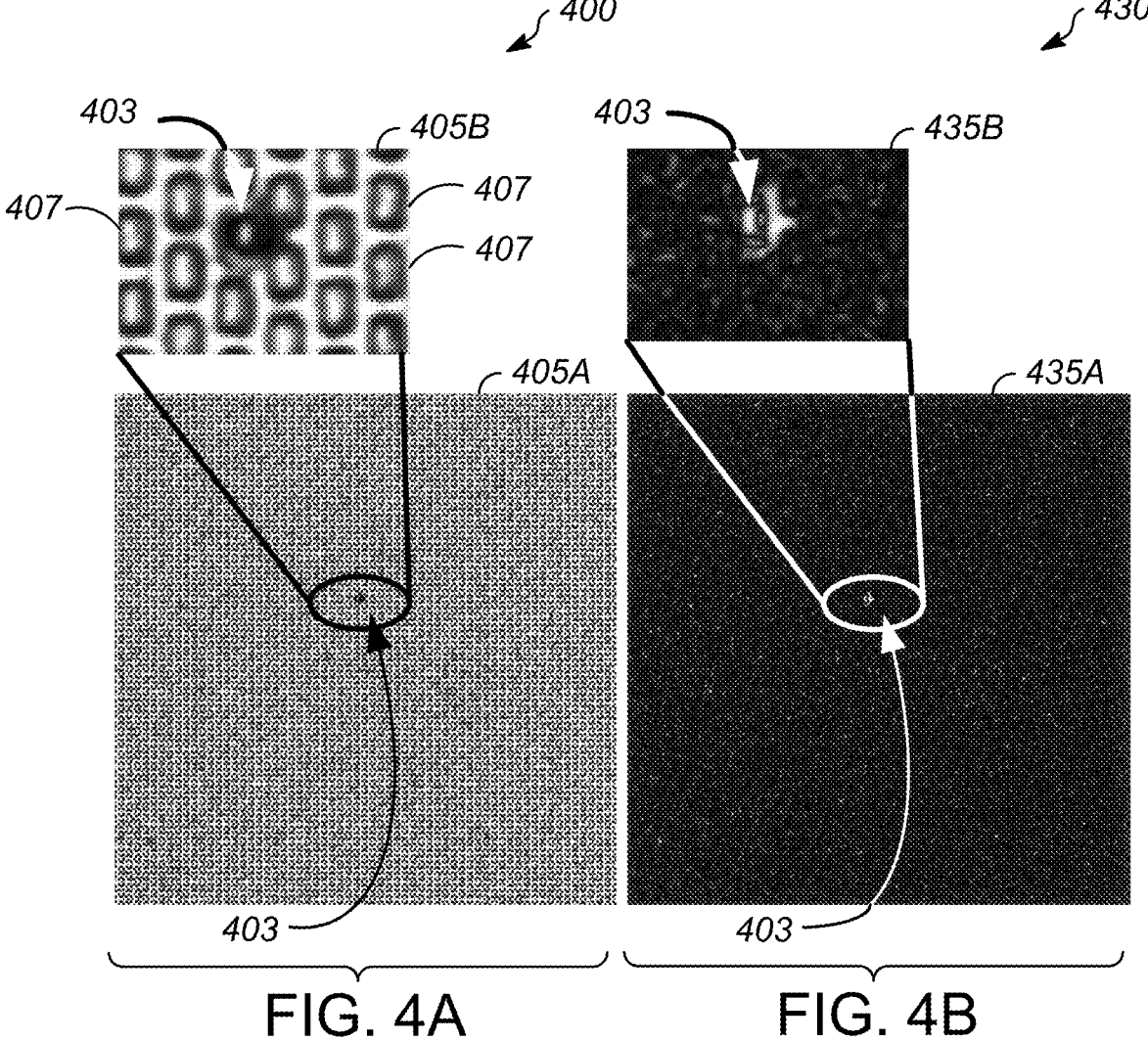
FIG. 4A                    FIG. 4B

PERIODIC-PATTERN BACKGROUND REMOVAL

CLAIM OF PRIORITY

This Non-Provisional Application claims priority to U.S. Provisional Application Ser. No. 63/388,562, filed Jul. 12, 2022, which is hereby incorporated by reference herein in its entirety.

TECHNOLOGY FIELD

The disclosed subject-matter is related generally to the field of substrate-metrology and/or inspection tools. More specifically, in various embodiments, the disclosed subject-matter is related to various types of mechanisms to manipulate an image by removing selected signals caused by a periodic pattern formed on substrates to enable a higher level of defect detection on substrates with sections of periodic-pattern(s).

BACKGROUND

Various types of algorithms are used in metrology and inspection tools to differentiate defects (e.g., non-planned features, particles, or other contamination) detected on substrates from background signals caused by periodic structures on the substrates. Such periodic structures can include, for example, intra-die periodicity, such as in dynamic random-access memory (DRAM) devices, line-space pairs for other memory-device types, or other types of periodic structures in the x-direction and/or the y-direction on a substrate.

The disclosed subject-matter presented herein provides a relatively fast and cost-effective method of detecting defects on substrates.

SUMMARY

This document describes, among other things, various types of techniques, methods, and mechanisms to manipulate an image by removing selected signals caused by a periodic pattern formed on substrates to enable a higher level of defect detection on substrates. Signals detected by various types of metrology and/or substrate-inspection systems that are caused by periodic patterns on inspected substrates can be reduced or eliminated by, for example, a Fourier analysis, followed by other threshold analyses, of the detected signals.

In various embodiments described herein, a transformation that decomposes signals from an acquired image of a substrate into individual spatial frequencies is applied. The decomposition processing is relatively fast, and for images below a certain size threshold, can be performed entirely on a central-processing unit embedded into, for example, a substrate-inspection system or other local or remote computer. As described herein, model images of a circuit are not required. The analysis and techniques can be based entirely of a relative energy (e.g., signal) level acquired by observed defects.

In various embodiments, the disclosed subject-matter is a method for manipulating an image by removing selected signals caused by a periodic pattern formed on substrates. The method includes acquiring an image of at least a portion of the substrate; applying a transform to decompose signals from the scanned image into individual spatial frequencies; applying equalization to the individual spatial frequencies to remove harmonic signal related to the periodic pattern;

applying an inverse function of a signal-decomposition transformation; and reconstructing an image of at least one defect from a transformed and equalized version of the image.

In various embodiments, the disclosed subject-matter includes a system to differentiate periodic patterns formed and detected on a substrate from at least one defect detected on the substrate. The system includes means for acquiring an image of at least a portion of the substrate; means for applying a transformation to decompose signals from the image into individual spatial frequencies; means for applying equalization to the individual spatial frequencies to remove harmonic signals related to the periodic pattern; means for applying an inverse function of a signal-decomposition transformation; and means for reconstructing a reconstructed image of the at least one defect from a transformed and equalized version of the image.

In various embodiments, the disclosed subject-matter is a system. The system includes at least one hardware-based processor and at least one memory. The at least one memory stores instructions that, when executed by the at least one hardware-based processor, cause the at least one hardware-based processor to perform operations including acquiring an image of at least a portion of the substrate; applying a transform to decompose signals from the image into individual spatial frequencies; applying equalization to the individual spatial frequencies to remove harmonic signals related to the periodic pattern; applying an inverse function of a signal-decomposition transformation; and reconstructing a reconstructed image of the at least one defect from a transformed and equalized version of the image.

BRIEF DESCRIPTION OF FIGURES

Various ones of the appended drawings merely illustrate example implementations of the present disclosure and should not be considered as limiting its scope.

FIG. 4A shows an example of a defect on an acquired raw-image including a periodic-background structure;

FIG. 4B shows an example of the defect on the acquired raw-image of FIG. 4A after removal of harmonic signals caused by the periodic-background structure;

DETAILED DESCRIPTION

The disclosed subject-matter is directed to image analysis and classification of defects within a fabrication facility (e.g., a semiconductor fabrication facility). In various embodiments, various mechanisms, techniques, and methods to subtract collected signals caused by a periodic pattern formed on substrates to enable a higher level of defect detection on substrates. Signals detected by various types of metrology and substrate-inspection systems that are caused by periodic patterns on inspected substrates can be reduced or eliminated by, for example, a Fourier analysis of the detected signals. Both gray-scale value thresholds and area thresholds may be applied after the Fourier analysis of the image and are sufficient for defect detection on a scanned image with a substantially-reduced number of false defects or no defects being present in a final image produced after processing.

Figure 1:
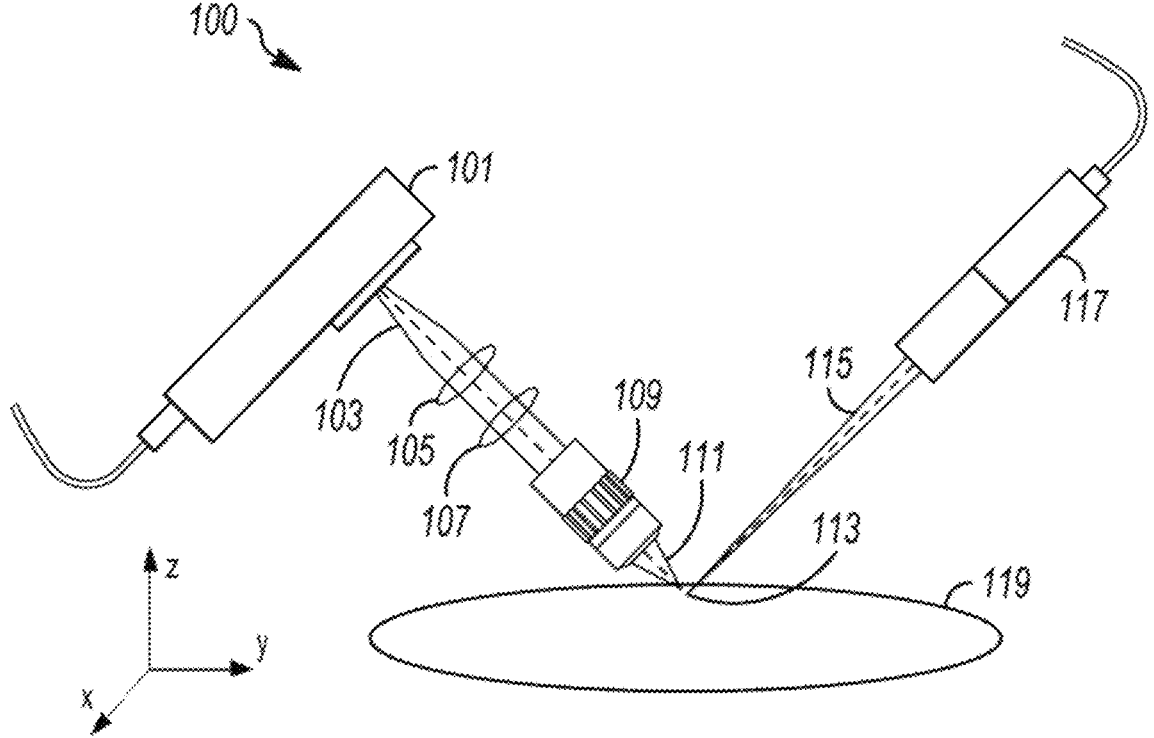
FIG. 1 shows a substrate-inspection system including a projected interrogation-line triangulation sensor configured to perform a two-dimensional (2D) and three-dimensional (3D, topographical) metrology measurements, which may be used with embodiments of the disclosed subject-matter.

FIG. 1 shows one type of an inspection system from which signals may be produced by a substrate under inspection. Therefore, FIG. 1 is provided merely as one type of inspection system and should not be considered as limiting the disclosed subject-matter in any way. Moreover, the inspection system of FIG. 1 may be replicated to simultaneously scan a bottom face of a substrate.

FIG. 1 shows a substrate-inspection system 100 including a projected interrogation-line triangulation sensor configured to perform two-dimensional (2D) three-dimensional (3D) metrology measurements, which may be used with embodiments of the disclosed subject-matter. The substrate-inspection system 100 can include an illumination source 117 configured to emit a beam of radiation 115 projecting an illumination area 113 (e.g., a line or area having a finite length and a finite width) onto a substrate 119. The beam of radiation 115 may be considered as producing an interrogation beam where the illumination area 113 serves to interrogate the surface of the substrate 119.

The illumination area 113 may comprise a line of radiation (e.g., light) across at least a portion of the substrate 119. Therefore, the illumination area 113 can comprise a line of radiation (e.g., a line of visible spectrum of light or a line of light that is outside the visible spectrum of light) from the beam of radiation 115. The line of radiation may be formed by, for example, one or more cylindrical lenses and/or rotating polygonal mirror elements and placed between the path of the beam of radiation 115 and the substrate 119. In other examples, the line of radiation may be formed by an acousto-optical deflector to control a spatial distribution of a beam of light, by varying an acoustic frequency to deflect the beam oat different angular positions. In other examples, the length of the beam of light may be related to a characteristic dimension (e.g., a diameter) of the substrate 119 (e.g., a 300 mm long line in the case of a 300 mm diameter substrate). The beam may be an area rather than a line where a light detection sensor, such as the camera 101 takes an image of the illuminated area or at least a portion of the illuminated area.

All or at least part of the beam of radiation 115 is re-radiated in the form of at least one of reflected (e.g., specular) radiation and scattered radiation (i.e., reflected and/or scattered from the substrate 119 in the form of a detected portion of re-radiated illumination 111. The detected portion of the re-radiated illumination 111 includes radiation reflected or scattered from the substrate 119 and features (e.g., planned structures), particles, or defects found on or within the substrate 119.

At least a portion of the detected portion of the reflected and/or scattered light is collected and transmitted by a first optical element 109. The detected portion of the re-radiated illumination 111 transmitted by the first optical element 109 continues through a first filter 107 and a second optical element 105 and is transmitted as a beam of radiation 103 to a light-detection sensor, such as a camera 101.

A number of wavelengths may be used with the substrate-inspection system 100 depending upon particular characteristics of interest to a user of the substrate-inspection system 100. For example, if the substrate 119 is a silicon wafer, the user may select an infrared (IR) wavelength to scan deeper into the substrate 119 to detect, for example, sub-surface defects. In other examples, the IR wavelength may be selected so as to scan through the substrate 119.

Although only a single illumination source 117 is shown in FIG. 1, one or more additional illumination sources 117 may be used to interrogate the substrate 119 at, for example, different wavelengths, intensities, polarization states, etc. In various embodiments (not shown explicitly) two independent interrogation-line generators may be used to inspect a substrate.

The substrate 119 may comprise a variety of substrate-types used in the semiconductor and allied fields (e.g., flat-panel displays, battery terminals, solar-cell panels, etc.) as well as other technical fields (e.g., quartz photomask production, production of ceramic windows for radiation monitoring, etc.). In the semiconductor field, the substrate 119 may comprise an elemental (e.g., silicon or germanium) semiconductor, a compound semiconductor (e.g., silicon carbide, gallium arsenide, or indium gallium arsenide), or various types of polymer resins (e.g., polyethylene-terephthalate (PET) having films deposited thereon or otherwise formed with a semiconducting layer), or numerous other types of substrates known independently in the art.

The first optical element 109 may comprise various types of beam forming and magnification elements know in the art. For example, the first optical element 109 may comprise one or more microscope-type objective lenses, with each of the objective lenses having one or more magnification lenses contained therein (e.g., having magnifications of two times, five times, ten times, and other magnifications depending upon a given inspection regimen). The first optical element 109 may therefore comprise microscope-type optical assemblies having an automatic or manual objective-lens change.

In embodiments, the first filter 107 may comprise a filter to selectivity pass given wavelengths of light. For example, the first filter 107 may comprise a long-pass filter to pass primarily only long wavelengths of light, a short-pass filter to pass primarily only short wavelengths of light, or a band-pass filter to pass primarily only wavelengths of light within a selected wavelength range. A person of ordinary skill in the art will recognize how to select the first filter to selectively pass wavelengths of interest.

For example, the first filter 107 may comprise a long-pass filter in a situation where one or more fluorescence (and/or photoluminescence in general) inspection and metrology methods are used with, for example, certain substrate types (e.g., gallium nitride (GaN) or silicon carbide (SiC) or other binary or compound semiconductors). For fluorescence inspection, the long-pass filter is placed into the collection-optics side, as shown in FIG. 1, to observe secondary-photon emissions.

In embodiments, the first filter 107 may comprise a polarization element to selectively pass radiation of a specific polarization state. A polarization element may be used in various applications for analyzing certain types of, for example, detected defects. The first filter 107 is discussed in more detail herein with regard to particular application uses.

In embodiments, the second optical element 105 may comprise additional types of optical filter. For example, the second optical element 105 may be a filter used in conjunction with the first filter 107 to form a bandpass filter. In embodiments, the second element may be used as a focusing element (e.g., a biconvex lens) to focus the re-radiated illumination 111 onto a sensor (e.g., a charge-coupled device (CCD) array or a complementary metal-oxide-semiconductor (CMOS) or other field-effect transistor or transconductance element) contained within the camera 101. In embodiments, the second optical element 105 may comprise an anamorphic lens to change an aspect ratio of the detected portion of the re-radiated illumination 111 into an aspect ratio to match that of the sensor within the camera 101.

The camera 101 includes (although not shown explicitly but understandable to a person of ordinary skill in the art), camera boards to facilitate at least one of a two-dimensional (2D) and a three-dimensional (3D) representation of the substrate 119 that is currently under inspection by the illumination area 113, and an image sensor (e.g., a CCD array, a CMOS-based sensor, an active-pixel sensor, or other sensor types). In embodiments, the image sensor may also be coupled with an electronic and/or mechanical shutter. The camera 101 may include an image-processing mode that is configurable for either 2D and/or 3D images.

In embodiments, the camera 101 may also include one or more camera lens (e.g., there may be a single variable focal-length lens or a plurality of single focal-length lenses. Single focal-length lenses may be selected in a focal-length range of, for example, 148 mm to 295 mm or another range selected for a given magnification or image-size area. In other embodiments, the camera 101 may not include any additional lenses but rely, for example, on the second optical element 105 to focus images on a focal plane of the camera 101.

The camera 101 may be mounted such that the sensor (e.g., the CCD array or the CMOS elements) contained therein is at a predetermined angle with reference to an imaginary line that is normal to a top surface of the substrate 119 (e.g., at a 45° angle with regard to the surface normal). In embodiments, the camera 101 may also include multiple cameras, with each camera mounted at the same or a different predetermined angle with reference to the surface normal. In an example, the camera 101 may comprise a CMOS-based camera.

Consequently, in an example embodiment of the substrate-inspection system 100 of FIG. 1, the illumination source 117 projects a line onto the substrate 119 and all features-of-interest located thereon or therein. The camera 101 acquires a 2D image of a profile of the detected portion of the re-radiated illumination 111. A processor (e.g., a micro-processor, an ASIC, an FPGA, or other processor type or types) converts the 2D image into a 3D line with subpixel accuracy. The processor may be located within or near the camera 101 or in a separate processing unit (not shown in FIG. 1, which is for example, remotely located from the substrate-inspection system 100). Software may accumulate a number of 3D lines to create topographical and intensity images for processing and topography reporting (including providing a complete 3D mapping of a substrate or selected area of a substrate).

Figure 2A:
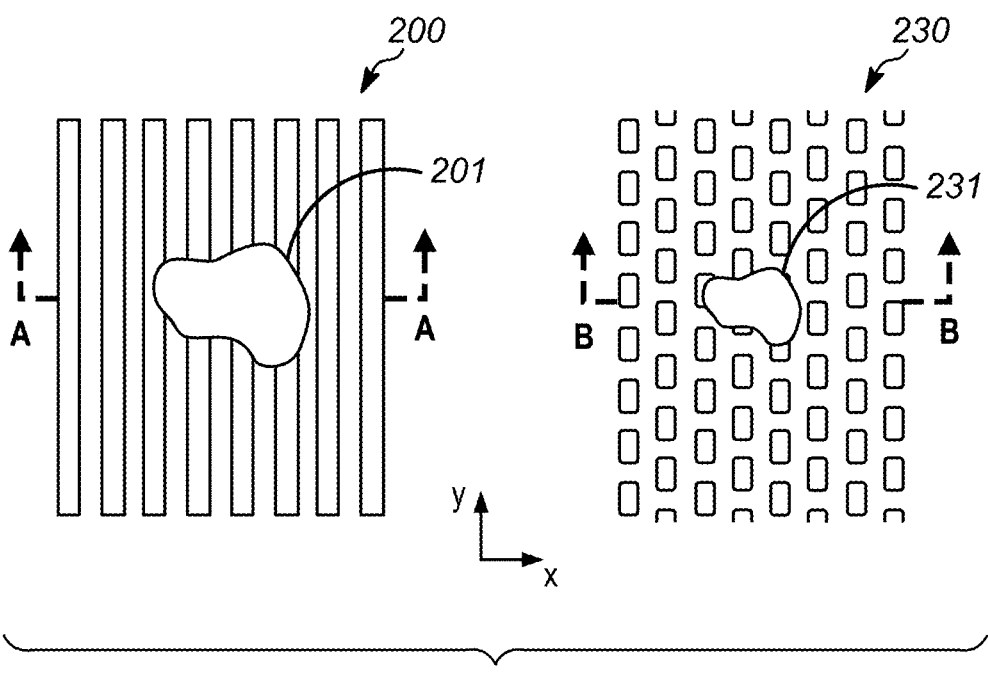
FIGS. 2A and 2B show examples of periodic patterns as may commonly be used on various types of electronic (e.g., semiconductor) devices, signals generated by the periodic patterns and captured by, for example, the substrate-inspection system of FIG. 1, may be at least partially or completely removed by techniques of the disclosed subject-matter.
Figure 2B:
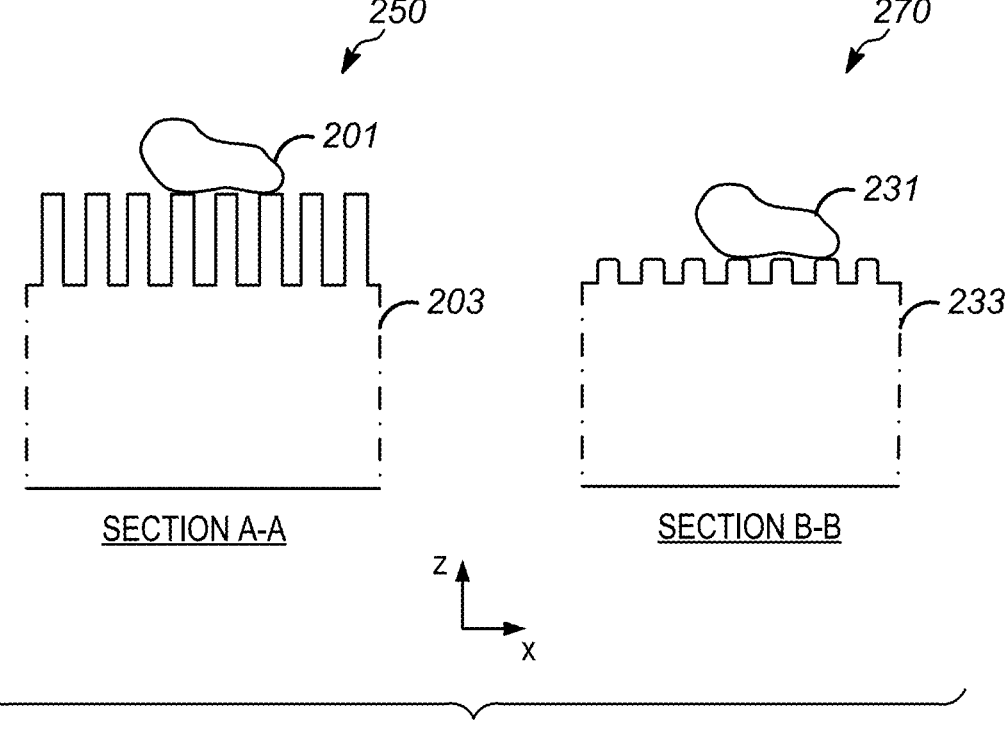

FIGS. 2A and 2B show examples of periodic patterns as may commonly be used on various types of electronic (e.g., semiconductor) devices. Signals generated by the periodic patterns and captured by, for example, the substrate-inspection system of FIG. 1, may be at least partially or completely removed by techniques of the disclosed subject-matter.

FIG. 2A shows examples of plan views of a first type 200 of periodic pattern and a second type 230 of periodic pattern. The first type 200 and the second type 230 of periodic patterns may be found on, for example, memory and logic devices. A person of ordinary skill in the art will recognize that other types of periodic patterns may be found on various types of electronic (e.g., semiconductor) devices.

Each of the first type 200 and the second type 230 of periodic patterns are shown to include a first defect 201 and a second defect 231, respectively. As noted above, defects can include, for example, various types of non-planned features, particles, or other contamination. Since the first defect 201 and the second defect 231 are generally not periodic patterns, the techniques described herein will not remove signals generated by the defects 201, 231.

FIG. 2B shows examples of cross-sectional views of the periodic patterns of FIG. 2A. A first cross-sectional view 250 of the first type 200 of periodic pattern is shown to include a portion of a substrate 203 upon which the first pattern was formed. A second cross-sectional view 270 of the second type 230 of periodic pattern is shown to include a portion of a substrate 233 upon which the second pattern was formed. Each of the substrates 203, 233 may be the same as or similar to each other. Further, each of the substrates 203, 233 may be the same as or similar to the substrate 119 of FIG. 1.

With reference again to FIG. 1, the substrate-inspection system 100 can further include an additional brightfield illumination source (not shown), which generates a light beam that is oriented substantially at a non-grazing angle-of-incidence to the surface of the substrate 119 and illuminates substantially the entire surface, in various embodiments. Specularly reflected light from the surface of the substrate 119 generated by the brightfield illumination source is then collected by the first optical element 109 and collected by the camera 101. The image acquired under brightfield illumination can be analyzed by, for example, a computer, discussed below with reference to FIG. 5.

Figure 3:
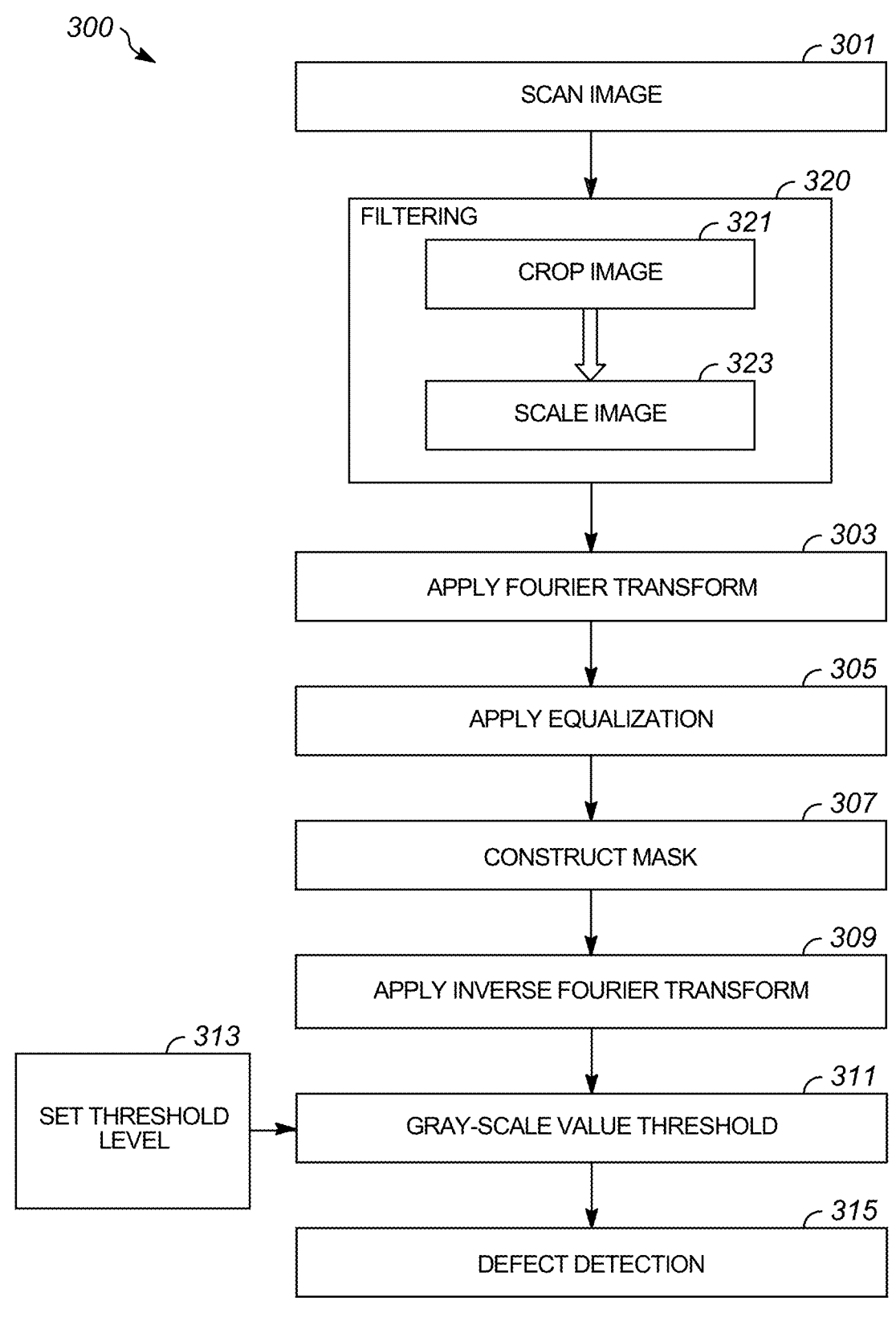
FIG. 3 shows a generalized example of a method for using the periodic-pattern background removal techniques, in accordance with various embodiments of the disclosed subject-matter, is shown.

Referring now to FIG. 3, a generalized example of a method 300 for using the periodic-pattern background removal techniques, in accordance with various embodiments of the disclosed subject-matter, is shown. Although the operations of FIG. 3 are shown in a particular order and as a series of linear steps, a person of ordinary skill in the art will recognize that certain steps may be repeated, skipped, performed in a different order, or repeated multiple times.

At operation 301, an image of a substrate (e.g., the substrate 119, 203, 233) is either measured or observed by, for example, the substrate-inspection system 100 of FIG. 1. The image (e.g., a scanned image) may then be filtered, at operation 320. Filtering operations can include cropping the image, at operation 321, and scaling the image, at operation 323. The image may be cropped so that an integer number of periods occurs in each direction (or only one direction in the case of, for example, line-space pairs). Having an integer number of periods allows harmonics to later be removed more efficiently in, for example, Fourier space, as described in more detail, below. Further, the image may be scaled to highlight areas of interest of the scanned image. Areas of interest can include considering only those portions of the scanned image where defects are believed to exist within the image or areas in which particular defects are to be examined in more detail.

At operation 303, a Fourier transform is applied to either the original scanned image, or to a version of the scanned image that has been cropped and/or scaled at operations 321, 323. The Fourier transform is a mathematical transformation of a signal (based on a spatial image in this case) that decomposes functions of the image into individual spatial frequencies. A person of ordinary skill in the art will recognize that any type of transformation that decomposes the signal into individual spatial frequencies can also be used instead of, or in conjunction with, the Fourier transform.

At operation 305, equalization is applied to the Fourier transform. The equalization may include, for example, one or more low-pass filters, one or more band-pass filters, and/or one or more high-pass filters. Coefficients for the various filters can be determined based on the image.

At operation 307, a mask (e.g., an electronic mask to be applied to the transformed-signal data) is constructed based on the equalized and transformed image. The operation of creating the mask can include, for example, determining a level of equalization applied to the Fourier-transformed data. The mask construction may also be based on removing any signal data having a size threshold below a certain, pre-determined limit. For example, signal data having a size on the image of less than 10 pixels may be removed directly. The pre-determined limit may be based on a "killer-defect" size for a particular type of circuit being fabricated. For example, a small, deep sub-micron defect may be problematic on a memory or logic circuit. In contrast, a micron-level defect may be allowable on circuits with much greater feature sizes than the memory or logic circuit, such as on photovoltaic cells or power-circuit devices.

In certain embodiments, the method 300 may include an augmentation of the signal in frequency space to remove periodic features of a given frequency range from, for example, the Fourier-transformed data. In other embodiments, the method may combine the augmenting of the signal with an application of the constructed mask of operation 307.

In other embodiments, a pixel-area threshold may be applied to reconstructed image to further separate the at least one defect from the transformed and equalized version of the scanned image after operation 309.

The constructed mask is then applied to the image data and, at operation 309, an inverse-Fourier transform (or an inverse function of the decomposition function applied at operation 303) is applied to the current version of the image data. The inverse-Fourier transform synthesizes the original function (e.g., the scanned image data) from its current frequency-domain representation. However, the frequency portions of the spectrum comprising the periodic-background have now been removed, either completely or substantially, through the equalization and filtering operations described above.

At operation 311, a gray-scale value threshold may be applied to the inverted data, based on a pre-determined threshold level set at operation 313. The pre-determined threshold level may be based on a level to remove additional defects, for example, background-noise values as described in more detail with reference to FIGS. 4A through 4D.

At operation 315, an image of the defect is reconstructed. Additionally, a pixel-area threshold may be applied to a reconstructed image to further separate the at least one defect from the transformed and equalized version of the scanned image after operation 309. Other aspects of the defect detection process are continued as is also described in more detail with reference to FIGS. 4A through 4D.

FIG. 4A shows an example of a defect 403 on an acquired raw-image 400 including a periodic-background structure 405A. A magnified portion shows greater detail of the periodic-background structure 405B, including individual elements of the periodic structure 407 on or in which the defect 403 is located.

FIG. 4B shows an example 430 of the defect 403 on the acquired raw-image 400 of FIG. 4A after removal of harmonic signals caused by the periodic-background structure 405A. By removing the harmonic signals (e.g., as described above with reference to FIG. 3), the processed background 435A is either significantly free or totally free of signals that were caused by the periodic-background structure 405A of FIG. 4A. Consequently, the defect 403 is decidedly more visible on a magnified portion 435B of the processed background 435A.

Figures 4C, 4D:
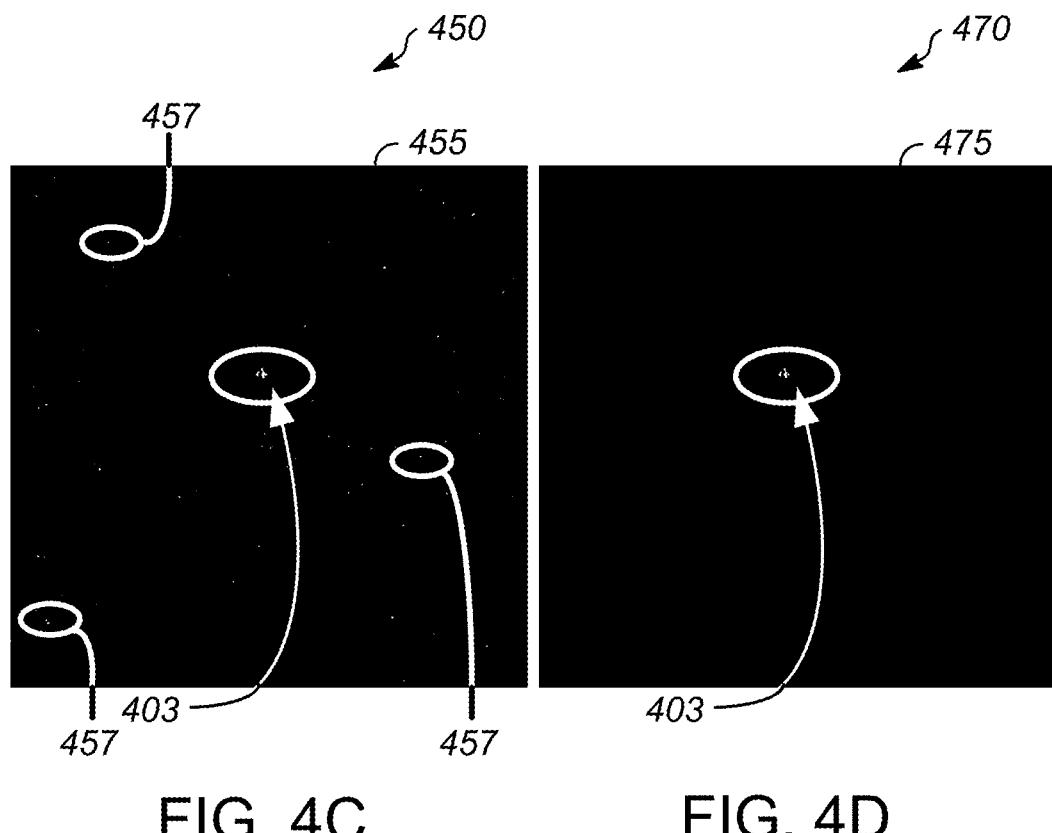
FIGS. 4C and 4D show examples of the image of FIG. 4B after additional processing.

FIGS. 4C and 4D show examples of the image of FIG. 4B after additional processing. For example, FIG. 4C shows an example 450 of a background 455 after a gray-scale value threshold has been applied in accordance with example operations described above at operations 311, 313. In addition to the defect 403 visible on the background 455, much smaller defects 457 are still observed. In this example, a gray-scale value to eliminate any features above a gray-scale level of 130 (arbitrary units) has been selected and applied.

In FIG. 4D, an example 470 of a background 475 after an operation to remove defects with areas below a desired threshold value have been removed. In this example, all defects with an area less than 10 pixels have been removed so as to focus more closely on the defect 403 of interest. The area-removal operation based on an input threshold level that has been applied is in accordance with example operations described above at operation 307 of FIG. 3. Consequently, the gray-scale value threshold and the area thresholds are sufficient for defect detection on a scanned image with a substantially-reduced number of false defects or no defects being present in a final image produced after processing.

Figure 5:
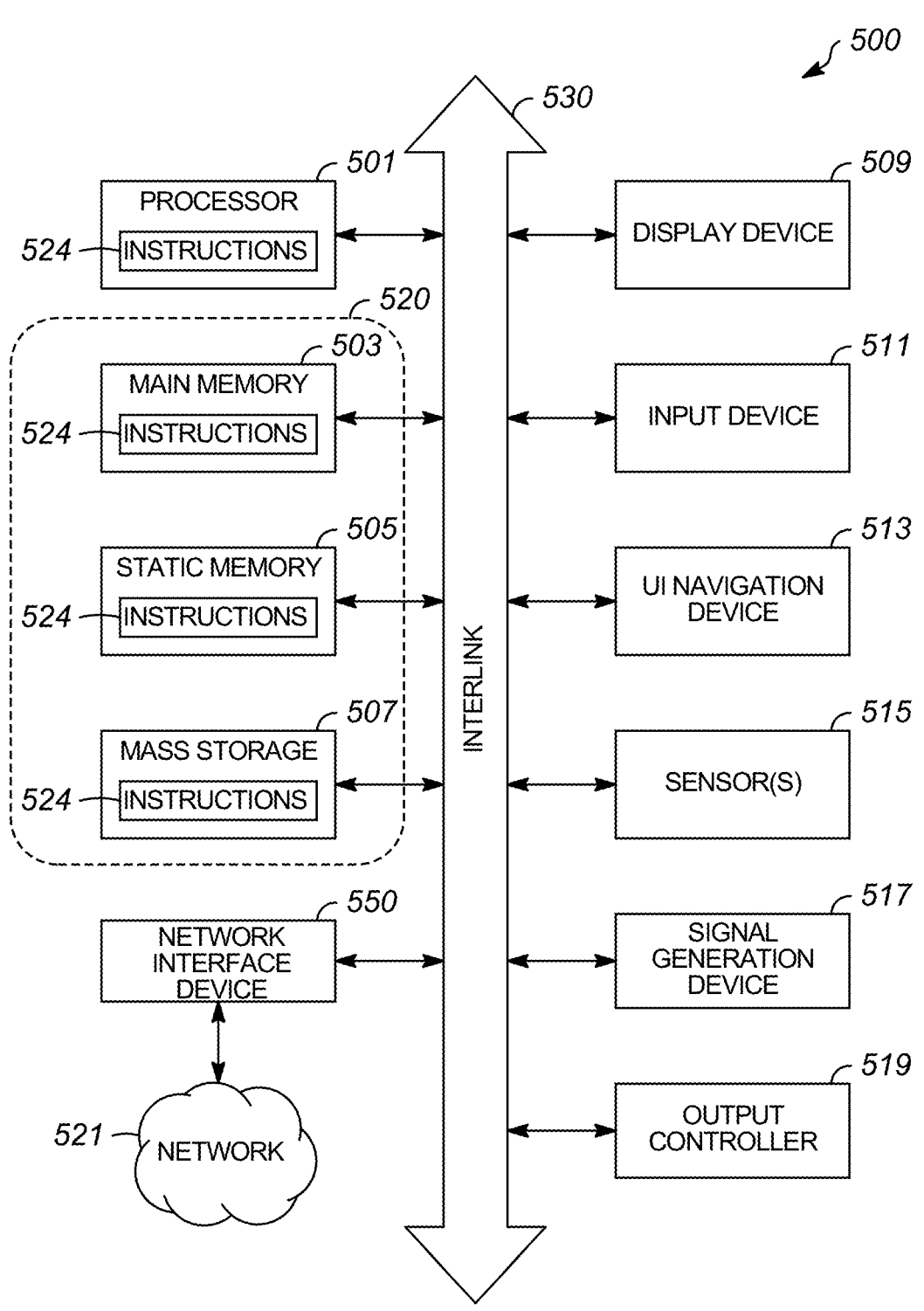
FIG. 5 shows a block diagram of an example comprising a machine upon which any one or more of the techniques (e.g., methodologies) discussed herein may be performed.

The methods and techniques shown and described herein can be performed using a portion or an entirety of a machine 500 as discussed below in relation to FIG. 5. FIG. 5 shows an exemplary block diagram comprising a machine 500 upon which any one or more of the techniques (e.g., methodologies) discussed herein may be performed. In various examples, the machine 500 may operate as a standalone device or may be connected (e.g., networked) to other machines.

In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 500 (e.g., computer system) may include a hardware-based processor 501 (e.g., a central processing unit (CPU), a graphics processing unit (GPU), a hardware processor core, or any combination thereof), a main memory 503 and a static memory 505, some or all of which may communicate with each other via an interlink 530 (e.g., a bus). The machine 500 may further include a display device 509, an input device 511 (e.g., an alphanumeric keyboard), and a user interface (UI) navigation device 513 (e.g., a mouse). In an example, the display device 509, the input device 511, and the UI navigation device 513 may comprise at least portions of a touch screen display. The machine 500 may additionally include a storage device 520 (e.g., a drive unit), a signal generation device 517 (e.g., a speaker), a network interface device 550, and one or more sensors 515, such as a global positioning system (GPS) sensor, compass, accelerometer, or other sensor. The machine 500 may include an output controller 519, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 520 may include a machine-readable medium on which is stored one or more sets of data structures or instructions 524 (e.g., software or firmware) embodying or utilized by any one or more of the techniques or functions described herein. The instructions 524 may also reside, completely or at least partially, within a main memory 503, within a static memory 505, within a mass storage device 507, or within the hardware-based processor 501 during execution thereof by the machine 500. In an example, one or any combination of the hardware-based processor 501, the main memory 503, the static memory 505, or the storage device 520 may constitute machine-readable media.

While the machine-readable medium is considered as a single medium, the term "machine-readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include tangible memory devices and media such as: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 524 may further be transmitted or received over a communications network 521 using a transmission medium via the network interface device 550 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known as Wi-Fi®, the IEEE 802.26 family of standards known as WiMax®), the IEEE 802.25.4 family of standards, peer-to-peer (P2P) networks, among others. In an example, the network interface device 550 may include one or more physical jacks (e.g., Ethernet, coaxial, or phone jacks) or one or more antennas to connect to the communications network 521. In an example, the network interface device 550 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

As used herein, the term "or" may be construed in an inclusive or exclusive sense. Further, other embodiments will be understood by a person of ordinary skill in the art based upon reading and understanding the disclosure provided. Moreover, the person of ordinary skill in the art will readily understand that various combinations of the techniques and examples provided herein may all be applied in various combinations.

Throughout this specification, plural instances may implement components, operations, or structures described as a single instance. Although individual operations are illustrated and described as separate operations, one or more of the individual operations may be performed concurrently, and, unless otherwise stated, nothing requires that the operations necessarily be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Further, although not shown explicitly but understandable to a skilled artisan, each of the various arrangements, quantities, and number of elements may be varied (e.g., the number of grey-scale values applied in producing one or more masks at different levels, etc.). Moreover, each of the examples shown and described herein is merely representative of one possible configuration and should not be taken as limiting the scope of the disclosure.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of operations, systems, and processes have been described, these methods, operations, systems, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to ascertain quickly the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The description provided herein includes illustrative examples, devices, and apparatuses that embody various aspects of the matter described in this document. In the description, for purposes of explanation, numerous specific details are set forth in order to provide an understanding of various embodiments of the matter discussed. It will be evident however, to those of ordinary skill in the art, that various embodiments of the disclosed subject-matter may be practiced without these specific details. Further, well-known structures, materials, and techniques have not been shown in detail, so as not to obscure the various illustrated embodiments. As used herein, the terms "about," "approximately," and "substantially" may refer to values that are, for example, within ±10% of a given value or range of values.

THE FOLLOWING NUMBERED EXAMPLES
ARE SPECIFIC EMBODIMENTS OF THE
DISCLOSED SUBJECT-MATTER

Example 1: In various embodiments, the disclosed subject-matter includes a method for manipulating an image by removing selected signals caused by a periodic pattern formed on a substrate. The method includes acquiring an image of at least a portion of the substrate; applying a transform to decompose signals from the image into individual spatial frequencies; applying equalization to the individual spatial frequencies to remove harmonic signal related to the periodic pattern; applying an inverse function of a signal-decomposition transformation; and reconstructing a reconstructed image of at least one defect from a transformed and equalized version of the image.

Example 2: The method of Example 1, further comprising applying a gray-scale value threshold to the reconstructed image to further separate the at least one defect from the transformed and equalized version of the image.

Example 3: The method of either Example 1 or Example 2, further comprising applying a pixel-area threshold to the reconstructed image to further separate the at least one defect from the transformed and equalized version of the image.

Example 4: The method of any one of the previous Examples, further comprising cropping the image so that an integer number of periods occurs in at least one direction.

Example 5: The method of any one of the previous Examples, wherein the transform is a Fourier transform.

Example 6: The method of any one of the previous Examples, wherein the inverse function is an inverse Fourier transform.

Example 7: The method of any one of the previous Examples, further comprising constructing a mask to apply to the equalized individual spatial frequencies.

Example 8: In various embodiments, the disclosed subject-matter includes a system to differentiate periodic patterns formed and detected on a substrate from at least one defect detected on the substrate. The system includes means for acquiring an image of at least a portion of the substrate; means for applying a transformation to decompose signals from the image into individual spatial frequencies; means for applying equalization to the individual spatial frequencies to remove harmonic signals related to the periodic pattern; means for applying an inverse function of a signal-decomposition transformation; and means for reconstructing a reconstructed image of the at least one defect from a transformed and equalized version of the image.

Example 9: The system of Example 8, further comprising augmenting remaining signals in frequency space to remove periodic features of a given frequency range from the transformation of the decomposed signals.

Example 10: The system of either Example 8 or Example 9, further comprising constructing a mask to apply to the equalized individual spatial frequencies.

Example 11: The system of any one of Example 8 through Example 10, further comprising applying a gray-scale value threshold to the reconstructed image to further separate the at least one defect from the transformed and equalized version of the image.

Example 12: The system of any one of Example 8 through Example 11, further comprising applying a pixel-area threshold to the reconstructed image to further separate the at least one defect from the transformed and equalized version of the image.

Example 13: The system of any one of Example 8 through Example 12, further comprising cropping the image so that an integer number of periods occurs in at least one direction.

Example 14: The system of any one of Example 8 through Example 13, wherein the transform is a Fourier transform.

Example 15: The system of any one of Example 8 through Example 14, wherein the inverse function is an inverse Fourier transform.

Example 16: In various embodiments, the disclosed subject-matter is a system. The system includes at least one hardware-based processor and at least one memory. The at least one memory stores instructions that, when executed by the at least one hardware-based processor, cause the at least one hardware-based processor to perform operations including acquiring an image of at least a portion of the substrate; applying a transform to decompose signals from the image into individual spatial frequencies; applying equalization to the individual spatial frequencies to remove harmonic signals related to the periodic pattern; applying an inverse function of a signal-decomposition transformation; and reconstructing a reconstructed image of the at least one defect from a transformed and equalized version of the image.

Example 17: The system of Example 16, further comprising augmenting remaining signals in frequency space to remove periodic features of a given frequency range from the transformation of the decomposed signals.

Example 18: The system of either Example 16 or Example 17, further comprising constructing a mask to apply to the equalized individual spatial frequencies.

Example 19: The system of any one of Example 15 through Example 17, further comprising applying a gray-scale value threshold to the reconstructed image to further separate the at least one defect from the transformed and equalized version of the image.

Example 20: The system of any one of Example 15 through Example 18, further comprising applying a pixel-area threshold to the reconstructed image to further separate the at least one defect from the transformed and equalized version of the image.

Example 21: The system of any one of Example 15 through Example 19, further comprising cropping the image so that an integer number of periods occurs in at least one direction.

What is claimed:

1. A method for manipulating an image by removing selected signals caused by a periodic pattern formed on a substrate, the method comprising:
   acquiring an image of at least a portion of the substrate;
   cropping the image so that an integer number of periods occurs in at least one direction;
   applying a transform to decompose signals from the image into individual spatial frequencies;
   applying equalization to the individual spatial frequencies to remove harmonic signal related to the periodic pattern;
   applying an inverse function of a signal-decomposition transformation; and
   reconstructing a reconstructed image of at least one defect from a transformed and equalized version of the image.

2. The method of claim 1, further comprising applying a gray-scale value threshold to the reconstructed image to further separate the at least one defect from the transformed and equalized version of the image.

3. The method of claim 1, further comprising applying a pixel-area threshold to the reconstructed image to further separate the at least one defect from the transformed and equalized version of the image.

4. The method of claim 1, wherein the transform is a Fourier transform.

5. The method of claim 1, wherein the inverse function is an inverse Fourier transform.

6. The method of claim 1, further comprising constructing a mask to apply to the equalized individual spatial frequencies.

7. An apparatus to differentiate periodic patterns formed and detected on a substrate from at least one defect detected on the substrate, the apparatus comprising:
   means for acquiring an image of at least a portion of the substrate;
   means for cropping the image so that an integer number of periods occurs in at least one direction;
   means for applying a transformation to decompose signals from the image into individual spatial frequencies;
   means for applying equalization to the individual spatial frequencies to remove harmonic signals related to a periodic pattern;
   means for applying an inverse function of a signal-decomposition transformation; and
   means for reconstructing a reconstructed image of the at least one defect from a transformed and equalized version of the image.

8. The apparatus of claim 7, further comprising means for augmenting remaining signals in frequency space to remove periodic features of a given frequency range from the transformation of the decomposed signals.

9. The apparatus of claim 7, further comprising means for constructing a mask to apply to the equalized individual spatial frequencies.

10. The apparatus of claim 7, further comprising means for applying a gray-scale value threshold to the reconstructed image to further separate the at least one defect from the transformed and equalized version of the image.

11. The apparatus of claim 7, further comprising means for applying a pixel-area threshold to the reconstructed image to further separate the at least one defect from the transformed and equalized version of the image.

12. The apparatus of claim 7, wherein the transform is a Fourier transform.

13. The apparatus of claim 7, wherein the inverse function is an inverse Fourier transform.

14. A system comprising:
   at least one hardware-based processor; and
   at least one memory storing instructions that, when executed by the at least one hardware-based processor, cause the at least one hardware-based processor to perform operations comprising:
   acquiring an image of at least a portion of the substrate;
   cropping the image so that an integer number of periods occurs in at least one direction;
   applying a transform to decompose signals from the image into individual spatial frequencies;
   applying equalization to the individual spatial frequencies to remove harmonic signals related to a periodic pattern;
   applying an inverse function of a signal-decomposition transformation; and
   reconstructing a reconstructed image of the at least one defect from a transformed and equalized version of the image.

15. The system of claim 14, further comprising augmenting remaining signals in frequency space to remove periodic features of a given frequency range from the transformation of the decomposed signals.

16. The system of claim 14, further comprising constructing a mask to apply to the equalized individual spatial frequencies.

17. The system of claim 14, further comprising applying a gray-scale value threshold to the reconstructed image to further separate the at least one defect from the transformed and equalized version of the image.

18. The system of claim 14, further comprising applying a pixel-area threshold to the reconstructed image to further separate the at least one defect from the transformed and equalized version of the image.

* * * * *